United States Patent [19]
Bilbrey

[11] 3,777,696
[45] Dec. 11, 1973

[54] TEMPERATURE SENSING DEVICE
[75] Inventor: Robert A. Bilbrey, Orinda, Calif.
[73] Assignee: Benjamin W. West, dba California Controls Company, Berkeley, Calif.
[22] Filed: Mar. 29, 1972
[21] Appl. No.: 239,030

[52] U.S. Cl............. 116/114.5, 73/358, 246/169 A
[51] Int. Cl. .............................................. G01k 1/02
[58] Field of Search................. 116/114.5, 106, 101; 73/358; 137/223, 72; 246/169, 169 A

[56] References Cited
UNITED STATES PATENTS

| | | | |
|---|---|---|---|
| 1,244,330 | 10/1917 | Holt | 137/223 |
| 1,675,780 | 7/1928 | Alric | 116/114.5 X |
| 3,140,611 | 7/1964 | Kliewer | 73/358 |
| 3,290,942 | 12/1966 | Carbaugh et al. | 73/358 |
| 3,401,666 | 9/1968 | Munroe | 116/114.5 |
| 3,626,897 | 12/1971 | Kliewer | 116/114.5 |

*Primary Examiner*—Louis J. Capozi
*Attorney*—William E. Anderson et al.

[57] ABSTRACT

A temperature sensing device is described having a body defining a cylinder with a closed end and an open end. A rod extends through the open end and carries a piston which is movable with the rod in the cylinder. The piston is resiliently biased away from the closed end of the cylinder and is held near the closed end of the cylinder by a meltable metal or alloy solidified on the side of the piston toward the open end of the cylinder. When the metal or alloy melts in response to a rise in temperature, the piston moves toward the open end of the cylinder and the molten metal or alloy flows to the opposite side of the piston.

11 Claims, 3 Drawing Figures

PATENTED DEC 11 1973 3,777,696

TEMPERATURE SENSING DEVICE

This invention relates to temperature sensing devices and, more particularly, to a temperature sensing device which is particularly adapted for sensing temperature in a bearing and which is readily reuseable.

Various types of temperature sensing devices are known wherein an element, such as a rod, is moved in response to the sensing of a rise in temperature to a predetermined level. Such devices may be utilized to initiate a warning or cause a shut-down in response to the sensing of a sudden temperature rise in a bearing or other machine part. Such devices may be utilized to trigger a relief or vent valve to produce the desired shut-down, or may be used to trigger any other suitable mechanical or electrical device in response to movement of a rod or similar element in the temperature sensing device. Thus, various types of moving parts, such as bearings, which may be subject to sudden rises in operating temperatures resulting from wear or other malfunction, overload, or failure of lubrication, may be successfully temperature monitored and saved from heat damage by the use of such a temperature sensing device.

In one useful form of temperature sensing devices of the general type described, a rod or other movable element is used which is biased in a selected direction by a suitable spring. The rod or movable element is retained against the bias by a meltable metal or alloy. Typically, a eutectic alloy is used, but the term "alloy" as used herein and in the claims is intended to include a pure metal, an alloy, or a eutectic alloy. Upon a sudden rise in temperature sufficient to melt the alloy, the rod or movable element is released from its position and moves with the spring bias to trigger a mechanical or electrical device for shut-off, warning, or other convenient purpose. Typically, the alloy is used as a eutectic having a sudden solidus-liquidus phase transfer at a trigger temperature considered to be critical in the particular region for which temperature is being sensed or monitored.

Temperature sensing devices utilizing alloys which melt upon a sudden rise in temperature offer significant advantages over other types of devices. More particularly, they do not require the often complex wiring systems of electrical thermocouple detectors. Moreover, such devices provide a very rapid response, high reliability, and low cost. In addition, such devices are typically easy to install and may be made in a very small size.

A significant disadvantage of known temperature sensing devices using meltable alloys is that, once the device has responsded to a sudden rise in temperature with coincident melting of the alloy, the device must be replaced. This often makes such devices impractical, especially where overheating may occur frequently, since their replacement cost may become excessive.

It is an object of the present invention to provide an improved temperature sensing device.

Another object of the invention is to provide a temperature sensing device utilizing a meltable alloy which may be readily reused.

Another object of the invention is to provide a temperature sensing device of high reliability and low cost.

It is another object of the invention to provide an improved temperature sensing device which is relatively easy to install and provides a rapid response time.

Other objects of the invention will become apparent to those skilled in the art from the following description, taken in connection with the accompanying drawings wherein.

Figure 1:
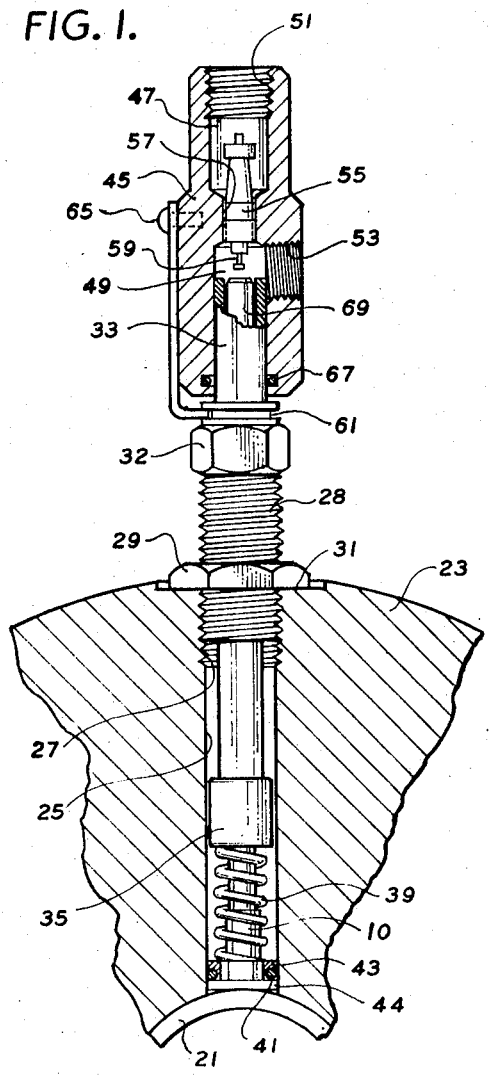
FIG. 1 is a full section view of a temperature sensing device constructed in accordance with the invention used for sensing the temperature of a bearing and operable to actuate a vent valve, as shown.

Very generally, the temperature sensing device 10 of the invention comprises a body 11 defining a cylinder 12 having a closed first end 13 and an open second end 14. The body is adapted for placing the closed first end in a region where temperature is to be sensed. A rod 15 extends through the open end and is movable axially in the cylinder. A piston 16 is carried by the rod within the cylinder and is movable with the rod in the cylinder from a first position toward the closed end of the cylinder to a second position spaced from the closed end of the cylinder. Bias means 17 resiliently bias the piston toward the second position. A quantity of alloy 18 is disposed within the cylinder for holding the piston in the first position when the alloy is solidified on the side of the piston toward the open end of the cylinder. Upon a rise in temperature to the melting point of the alloy, the piston is released and is moved by the bias means 17 toward the open end of the cylinder. The piston is shaped to allow the molten alloy to flow from one side of the piston to the other as it moves.

Referring now more particularly to the drawings, FIG. 1 shows a temperature sensing device 10 constructed in accordance with the invention used for monitoring the temperature of a bearing. The device is operable to actuate a valve which vents upon actuation to produce a suitable reaction in a pneumatic system to which the valve is attached.

More particularly, the outer sleeve 21 of a journal bearing is shown mounted in a suitable bearing housing 23. The bearing housing is provided with a temperature well 25 bored therein, the upper end of the temperature well being provided with threads 27. A sleeve 28, having threads on its outer surface, is threaded into the temperature well 25 on the threads 27. A nut 32, formed at the upper end of the sleeve 28, enables the sleeve to be turned in the temperature well 25, to adjust its position axially with respect to the bearing housing. The sleeve 28 is locked in place by a lock nut 29 which seats against a circular flat 31 in the bearing housing 23 at the upper end of the temperature well 25.

A tube 33 is fitted tightly within the sleeve 28 and projects from both the upper end of the sleeve and the lower end of the sleeve. Thus, the tube moves with the sleeve as it is positioned in the temperature well 25. The tube 33 is provided with an enlarged collar 35 carried on its lower end.

The temperature sensing device 10 of the invention is positioned within the temperature well 25 at the end thereof adjacent the outer race 21 of the bearing. As will be explained in greater detail, one end of the temperature sensing device 10 is positioned against the outer surface of the outer race 21. The temperature sensing device is held against the outer race by the bias provided by a coil spring 39 which is held in compression between the body 11 (acting through a seal described below) of the temperature sensing device and the collar 35.

In order to prevent bearing lubricant from migrating from the bearing up through the temperature well 25 (more specifically through the tube 33), an annular seal is provided between the body 11 of the temperature sensing device 10 and the wall of the temperature well 25. The seal comprises a flexible annular seal 41, such as an "O-ring" which is capable of radial expansion. An expander 43 is provided comprising a ring having a frustoconical surface on its outer side abutting the annular seal 41. The bias of the spring 39, which engages the ring 43 at the lower end of the spring, urges the ring axially against the annular seal 41. This forces the annular seal radially outward into engagement with the wall of the temperature well 25, providing the desired seal. Force provided by the spring also is transmitted in the axial direction to the body 11 through the provision of an annular flange 44 on the body.

As previously mentioned, the temperature sensing device of the invention is, in the illustrated embodiment, used to operate a vent valve. The valve is indicated as being mounted on the upper end of the sleeve 28. The valve comprises a valve housing 45 having an upper chamber 7 and a lower chamber 49. The upper chamber 47 is provided with a threaded orifice 51 for connection into a pneumatic system which is to be vented upon the sensing of a rise in temperature above a predetermined level. A horizontal bored orifice 53 is provided in the valve body 45 communicating with the lower chamber 49. The orifice 53 is threaded and is adapted for connection to a vent system. A poppet 55, of any suitable construction, is provided in an opening 57 communicating between the upper chamber 47 and the lower chamber 49 of the valve. Upon opening of the poppet 55, communication from the chamber 47 to the chamber 49 is provided, thus allowing venting to occur through the orifice 53. The poppet 55 contains a stem 59 which projects downwardly into the lower chamber 49.

In order to mount the valve in position, the upper end of the sleeve 28 above the nut 37 is provided with an annular groove 61. An L-shaped spring clip 63 is provided mounted to the outer surface of the valve body 47. The spring clip is flexible and is held tightly against the valve body by a screw 65. The valve body is mounted on the upper end of the tube 33, being sealed thereto by a suitable annular seal 67. The valve body is retained in place, with the upper end of the tube 33 projecting into the chamber 49 by means of the spring clip, which inserts into the annular groove 61 at the top of the sleeve 28.

In order to operate the poppet 55 in response to a rise in temperature, a rod extension 69 is mounted to the rod 15 of the temperature sensing device, as explained in greater detail below, and is moved with the rod 15 in response to the sensing of a rise in temperature above a predetermined level. When this occurs, the rod 69 engages the stem 59 of the poppet 55, opening the poppet and causing venting as previously explained.

Figure 2:
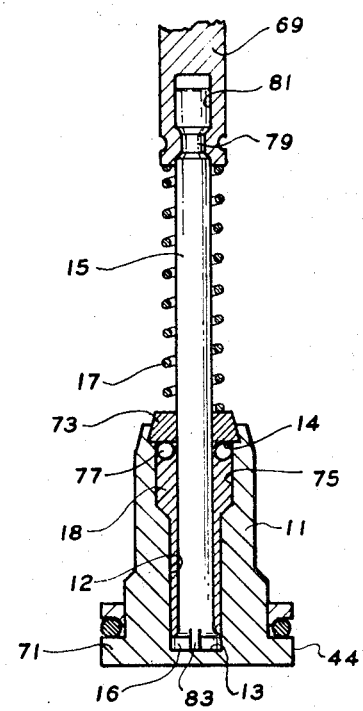
FIG. 2 is an enlarged full section view of the temperature sensing device of FIG. 1 shown in the unactuated condition.
Figure 3:
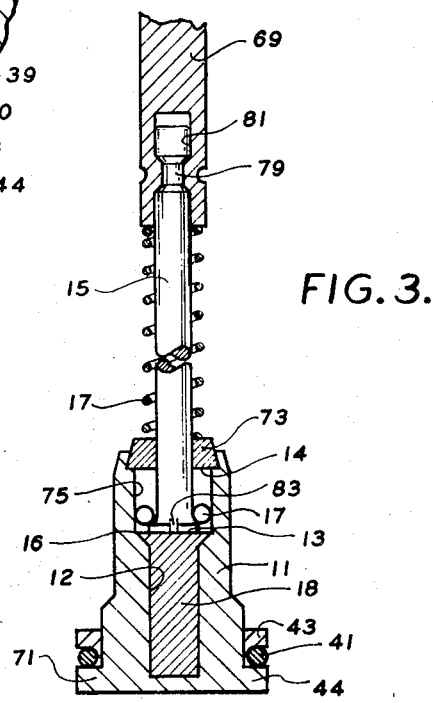
FIG. 3 is an enlarged full section view of a temperature sensing device of the invention after it has been actuated.

Referring now to FIGS. 2 and 3, the details of the temperature sensing device 10 of the invention may be more clearly seen. FIG. 2 shows the device as it appears prior to release. The device includes the body 11 which defines the cylinder 12. The lower exterior part of the body 11 is provided with the annular flange 44 upon the upper surface of which the annular seal 41 seats. The lower end of the body 11 as shown in FIG. 2 is adapted to be biased against the outer race 21 of the bearing as shown in FIG. 1.

The open end 14 of the cylinder 12 is partially closed by means of a rod guide 73. The rod guide is coined by a suitable tool to be secured at the upper end of the cylinder 12. A central opening is provided in the guide 73 for guiding the rod 15 in its axial movement, explained below.

The upper end of the cylinder 12 is provided with an enlarged section 75 just below the guide 73. An annular seal 77, which may be an "O-ring," is disposed surrounding the rod 15 within the enlarged section 75 of the cylinder 12. The annular seal 77 is of a size which completely fills the gap between the walls of the cylinder and the outer surface of the rod, thereby sealing the cylinder at its upper end. As will be explained, however, the annular seal 77 is free to move axially both with respect to the body 11 and the rod 15.

The upper end of the rod 15 is provided with an annular recess 79. The lower end of the rod 69 is provided with a short axial bore 81 into which the upper end of the rod 15 is inserted. The bore is of a depth such that the rod extension 69 extends downwardly past the annular groove 79. The rod extension 69 is secured on the rod 15 by swaging at its lower end to fill into the annular groove 70 and thus secure the rod and extension together axially.

As previously mentioned, the lower end of the rod 15 carries a piston 13. The piston is biased toward the open end of the cylinder 12 by means of a coil spring which comprises the previously mentioned bias means 17. The spring 17 seats against the underside of the guide 73 and against the lower end of the rod extension 69. When the piston 13 is at the lower end of the cylinder 12, as illustrated in FIG. 2, the spring 17 is placed under compression.

In order to secure the piston 13 in the position shown in FIG. 2, the cylinder 12 is filled with a meltable alloy. The meltable alloy melts at a predetermined temperature, thereby allowing the piston to move upwardly in the cylinder 12 under the force provided by the spring 17. To allow fluid flow from one side of the piston 13 to the other during this movement, the piston is made of a suitable configuration. In the illustrated embodiment, the piston 13 is provided with a slot 83 therein which forms a passage extending from one side of the piston to the other to allow molten alloy to flow therethrough. Preferably, the alloy selected is a eutectic material which becomes molten very quickly upon the attachment of a preselected temperature.

Upon melting of the alloy, the device quickly attains the condition illustrated in FIG. 3. As may be seen in FIG. 3, the piston 13 has moved upwardly in the cylinder 12, and the molten eutectic or other alloy has flowed through the slot 83 to the lower end of the cylinder (i.e., the opposite side of the piston). At the same time, atmospheric pressure on the upper side of the annular seal 77, together with a slight vacuum created on the lower side as a result of movement of the piston, forces the seal down against the upper side of the piston and away from engagement with the guide 73. The purpose of the seal 77 is to prevent loss of eutectic through the slight clearance between the rod 15 and the rod guide 73, especially if the device is used in a non-vertical orientation.

Once actuation of the temperature sensing device has occured, the device may be returned from the condition shown in FIG. 3 to the condition shown in FIG. 2 very simply. The body of the device 11 is heated, once the bearing has cooled, to remelt the alloy or eutectic 18 contained within the cylinder. Once the alloy reaches the molten condition, the rod 15 is moved axially to force the piston 16 to return to the closed end 13 of the cylinder 12. In doing this, molten alloy flows through the slot 83 to the upper side of the piston, forcing the annular seal 77 upwardly against the guide 73, and filling the space above the piston. Once the alloy solidifies, the piston is retained in place and the device is in the condition shown in FIG. 2.

The device of the invention thus provides a temperature sensing device which not only is low in cost and highly reliable, but which may be readily reset and thereby used repeatedly. The device is of very small size, is capable of being manufactured at a low cost, is easily installed, and provides a rapid response upon the sensing of a rise in temperature.

Additional advantages from the device of the invention stem from the fact that expensive oil-air separators are not required in valve vent lines, since oil migration through the temperature sensor does not occur. This is because of the seal arrangement provided at the lower end of the body of the device. Because the seal does not contact the walls of the temperature well until the device is in place, conventional type drilled holes may be used for producing the temperature well, since a special smooth finish is not required.

For the foregoing reasons, it may therefore be seen that the invention provides an improved temperature sensing device offering unique advantages. Various modifications of the invention, in addition to those shown and described herein, will become apparent to those skilled in the art from the foregoing description and accompanying drawings. Such modifications are intended to fall within the scope of the appended claims.

What is claimed is:

1. A temperature sensing device, comprising, a body defining a cylinder having a closed first end and an open second end, said body being adapted for placing said closed first end in a region where temperature is to be sensed, a rod extending through said open end and being movable axially in said cylinder, a piston carried by said rod within said cylinder and being movable with said rod in said cylinder from a first position toward said first end of said cylinder to a second position spaced from said first end of said cylinder, said piston having a first side toward said first position and a second side toward said second position, bias means resiliently biasing said piston toward said second position, and a quantity of alloy within said cylinder for holding said piston in said first position when said alloy is solidified on said second side of said piston, said piston being shaped to allow said alloy when melted to flow either from said first side of said piston to said second side or from said second side of said piston to said first side.

2. A temperature sensing device according to claim 1 wherein said piston abuts said closed end of said cylinder when in said first position.

3. A temperature sensing device according to claim 1 wherein said piston is provided with a passage therethrough from one side to the other for allowing molten alloy to flow therethrough when said piston is displaced.

4. A temperature sensing device according to claim 1 wherein said cylinder is of enlarged diameter toward said closed end thereof, and wherein an annular seal is disposed in said enlarged diameter portion between said body and said rod, said annular seal being movable axially within said cylinder in response to fluid pressure exerted thereon.

5. A temperature sensing device according to claim 1 wherein said alloy is a eutectic.

6. A temperature sensing device according to claim 1 and further including a sleeve for slidably guiding said rod and means for adjustably mounting said sleeve in a temperature well.

7. A temperature sensing device according to claim 6 wherein said mounting means include spring means for resiliently biasing said body axially of said sleeve.

8. A temperature sensing device according to claim 7 including seal means for sealing said body against the temperature well.

9. A temperature sensing device according to claim 8 wherein said seal means include a radially deformable annular seal, and a ring having a frustoconical surface engaging said annular seal, said spring means engaging said ring to bias same axially against said annular seal.

10. A temperature sensing device, comprising, a body defining a cylinder having a closed first end and an open second end, said body being adapted for placing said closed first end in a region where temperature is to be sensed, a rod extending through said opening end and being movable axially in said cylinder, a piston carried by said rod within said cylinder and being movable with said rod in said cylinder from a first position toward said first end of said cylinder to a second position spaced from said first end of said cylinder, bias means resiliently biasing said piston toward said second position, said cylinder being of enlarged diameter toward said closed end thereof, an annular seal disposed in said enlarged diameter portion of said cylinder between said body and said rod, said annular seal being movable axially within said cylinder in response to fluid pressure exerted thereon, and a quantity of eutectic within said cylinder for holding said piston in said first position when said eutectic is solidified on the side of said piston toward said annular seal, said piston having a passage therethrough from one side to the other to allow molten eutectic to flow therethrough when said piston is displaced.

11. A temperature sensing device, comprising, a body defining a cylinder having a closed first end and an open second end, said body being adapted for placing said closed first end in a region where temperature is to be sensed, a rod extending through said open second end and being movable axially in said cylinder, means for moving said rod axially in said cylinder in response to the sensing of a predetermined temperature, a sleeve for slidably guiding said rod, means for adjustably mounting said sleeve in a temperature well, said mounting means including means for resiliently biasing said body axially of said sleeve, a radially deformable annular seal surrounding said body, a ring having a frustoconical surface engaging said annular seal, said spring means engaging said ring to bias same axially against said annular seal for sealing said body against the temperature well.

* * * * *